(12) United States Patent
Wornham (10) Patent No.: US 11,097,655 B2
(45) Date of Patent: Aug. 24, 2021

(54) WARNING DEVICE FOR A VEHICLE

(71) Applicant: Road Safety Designs Limited, Penarth (GB)

(72) Inventor: Stephen Wornham, Penarth (GB)

(73) Assignee: ROAD SAFETY DESIGNS LIMITED, Penarth (GB)

( * ) Notice: Subject to any disclaimer, the term of this patent is extended or adjusted under 35 U.S.C. 154(b) by 0 days.

(21) Appl. No.: 16/484,629

(22) PCT Filed: Feb. 8, 2018

(86) PCT No.: PCT/GB2018/050358
§ 371 (c)(1),
(2) Date: Aug. 8, 2019

(87) PCT Pub. No.: WO2018/146478
PCT Pub. Date: Aug. 16, 2018

(65) Prior Publication Data
US 2020/0039422 A1 Feb. 6, 2020

(30) Foreign Application Priority Data
Feb. 10, 2017 (GB) ..................... 1702228

(51) Int. Cl.
*B60Q 1/52* (2006.01)
*B60Q 1/26* (2006.01)
(Continued)

(52) U.S. Cl.
CPC ......... *B60Q 1/2692* (2013.01); *B60Q 1/0076* (2013.01); *B60Q 1/2661* (2013.01);
(Continued)

(58) Field of Classification Search
CPC .. B60Q 1/2692; B60Q 1/0076; B60Q 1/2661; B60Q 1/52; B60R 13/105; G09F 7/18; G09F 13/165; G09F 13/22
See application file for complete search history.

(56) References Cited

U.S. PATENT DOCUMENTS

| D111,585 S | 10/1938 | Kay |
| 3,262,415 A | 7/1966 | Rocco |
| (Continued) | | |

FOREIGN PATENT DOCUMENTS

| AU | 7629981 A | 4/1983 |
| CN | 2219526 Y | 2/1996 |
| (Continued) | | |

OTHER PUBLICATIONS

"Online search for rotary lock," http://www.bing.com/images/search?q=rotary+lock&FORM=AWIR [Accessed on May 25, 2017], 1 page.

(Continued)

*Primary Examiner* — Phung Nguyen
(74) *Attorney, Agent, or Firm* — Fredrikson & Byron, P.A.

(57) ABSTRACT

A warning device for a vehicle comprising a number plate support portion for supporting a number plate. The warning device further comprises a warning indicator. The number plate support portion is movably attached to the warning indicator. The number plate support portion is moveable from a first position covering the warning indicator to a second position revealing the warning indicator. Further, the warning device comprises a number plate support portion pivotably attached to the warning Indicator such that the number plate support portion and the warning device fold (Continued)

together and fold apart when the number plate support portion is moved between the first position and the second position.

26 Claims, 5 Drawing Sheets (51) Int. Cl.
*B60Q 1/00* (2006.01)
*B60R 13/10* (2006.01)
*G09F 7/18* (2006.01)
*G09F 13/16* (2006.01)
*G09F 13/22* (2006.01)

(52) U.S. Cl.
CPC ............. *B60Q 1/52* (2013.01); *B60R 13/105* (2013.01); *G09F 7/18* (2013.01); *G09F 13/165* (2013.01); *G09F 13/22* (2013.01); *G09F 2007/1865* (2013.01); *G09F 2007/1895* (2013.01); *G09F 2013/222* (2013.01)

(56) References Cited

U.S. PATENT DOCUMENTS

| | | | |
|---|---|---|---|
| 3,975,849 | A | 8/1976 | Tuleja |
| 4,016,450 | A | 4/1977 | Balekjian |
| 4,178,874 | A * | 12/1979 | Berns .............. G09F 21/04 116/28 R |
| 4,328,481 | A | 5/1982 | Sexton |
| D335,507 | S | 5/1993 | Kleiman |
| D367,676 | S | 3/1996 | Ortiz |
| 5,551,370 | A | 9/1996 | Hwang |
| 5,636,462 | A | 6/1997 | Kleiman |
| D401,878 | S | 12/1998 | Evanyk |
| 5,970,639 | A | 10/1999 | Hui |
| D446,465 | S | 8/2001 | Sloot |
| 6,796,060 | B1 * | 9/2004 | Meester ............ G09F 13/04 40/204 |
| D544,804 | S | 6/2007 | Chen |
| D557,625 | S | 12/2007 | Yu |
| 10,102,782 | B1 * | 10/2018 | Konshin ............ G09F 13/0413 |
| 10,147,342 | B2 * | 12/2018 | Gogatz ............ G09F 17/00 |
| 2008/0218329 | A1 | 9/2008 | Fan et al. |
| 2009/0308304 | A1 | 12/2009 | Ho |
| 2010/0180476 | A1 * | 7/2010 | Welch ............ G02B 6/0076 40/201 |
| 2012/0056757 | A1 | 3/2012 | Caudill |
| 2013/0016497 | A1 | 1/2013 | Anderson |
| 2015/0203054 | A1 | 7/2015 | Renke et al. |
| 2018/0154828 | A1 | 6/2018 | Wornham |
| 2019/0225148 | A1 | 7/2019 | Wornham |

FOREIGN PATENT DOCUMENTS

| | | |
|---|---|---|
| CN | 2377648 Y | 5/2000 |
| CN | 2437004 Y | 6/2001 |
| CN | 2789874 Y | 6/2006 |
| CN | 200962292 Y | 10/2007 |
| CN | 201126697 Y | 10/2008 |
| CN | 201681568 U | 12/2010 |
| CN | 201780746 U | 3/2011 |
| CN | 203631096 U | 6/2014 |
| CN | 204225004 U | 3/2015 |
| CN | 105185277 A | 12/2015 |
| DE | 29614119 U1 | 11/1996 |
| DE | 19741452 A1 | 6/1998 |
| DE | 29911991 U1 | 12/1999 |
| DE | 20021366 U1 | 8/2001 |
| DE | 20304840 U1 | 9/2003 |
| DE | 202004016041 U1 | 3/2005 |
| DE | 102004039390 A1 | 2/2006 |
| DE | 102010024470 A1 | 12/2011 |
| EP | 2147825 A1 | 1/2010 |
| FR | 2702783 A3 | 9/1994 |
| FR | 3010671 A3 | 3/2015 |
| GB | 985881 A | 3/1965 |
| GB | 2121225 A | 12/1983 |
| GB | 2254094 A | 9/1992 |
| GB | 2271012 A | 3/1994 |
| GB | 2312457 A | 10/1997 |
| GB | 2483071 A | 2/2012 |
| IE | S65975 B2 | 11/1995 |
| JP | H05-04552 A | 1/1993 |
| JP | H05-35491 U | 5/1993 |
| JP | 2004339928 A1 | 12/2004 |
| KR | 2020080002486 U | 7/2008 |
| KR | 101070616 B1 | 10/2011 |
| KR | 1020120012586 A | 2/2012 |
| KR | 1020120108407 A | 10/2012 |
| KR | 1020130048352 A | 5/2013 |
| KR | 200471562 Y1 | 2/2014 |
| KR | 1020150056011 A | 5/2015 |
| KR | 2020160003523 U | 10/2016 |
| KR | 101686816 B1 | 12/2016 |
| TW | M499627 U | 4/2015 |
| WO | 2011013113 A1 | 2/2011 |
| WO | 2016178030 A2 | 11/2016 |

OTHER PUBLICATIONS

"Online search for multiple storage compartments," http://www.bing.com/images/search?q=multiple+storage+compartment&FORM=HDRSC2 [Accessed on May 25, 2017], 1 page.

"Number Plate First Aid Kit for Motorcycles / ATVs—eBay," bobs-bike-stuff / eBay; May 12, 2015. See http://www.ebay.co.uk/itm/201087859553?orig_cvip=true—Accessed Aug. 8, 2017.

International Pat. App. No. PCT/GB2018/050358, International Preliminary Report on Patentability dated May 21, 2019, 17 pages.

UK Pat. App. No. 1702228.6, Search Report dated Aug. 9, 2017, 4 pages.

PCT International Search Report and Written Opinion dated May 15, 2018 for Intl. App. No. PCT/GB2018/050358, from which the instant application is based, 10 pgs.

* cited by examiner

WARNING DEVICE FOR A VEHICLE

RELATED APPLICATIONS

This application is a 35 U.S.C. 371 national stage filing from International Application No. PCT/GB2018/050358, filed Feb. 8, 2018, which claims priority to British Application No. 1702228.6, filed Feb. 10, 2017, the teachings of which are incorporated herein by reference.

BACKGROUND OF THE INVENTION

This invention relates to the field of warning devices and particularly to warning devices for use in motoring that are deployed in the event of a motoring emergency, such as a vehicle breakdown.

Motor vehicles generally utilise lights that are already built in to the vehicle to provide a warning system in the event of an emergency, such as a breakdown. For example, a vehicle typically flashes its indicator lights simultaneously to indicate to approaching motorists that the vehicle is not operating as normal (this is often referred to as the vehicle's hazard lights). However, as this warning system uses lights that are used by all vehicles during their normal operation, they are often mistaken for a vehicle that is, for example, simply indicating that it is changing direction and thereby operating as normal. As such, this type of warning system fails to provide adequate warning to approaching motorists, endangering both the users of the broken down vehicle and the passing motorists.

In an attempt to improve this situation, motorists may carry a separate warning device which can be displayed externally to the vehicle in the case of an emergency. The most common and well known warning device used by motorists is the warning triangle. These warning devices are used to indicate a hazard in the road that may not be readily apparent to approaching motorists. They are used in many countries, and normally take the form of an equilateral triangle. The appearance of warning triangles varies from country to country but they are generally designed to have bright colours that are highly contrasting with the surrounding environment. This helps approaching drivers notice the warning triangle and thus avoid the hazard.

These warning triangles are routinely used by a variety of different organisations and governmental bodies such as police forces, highway agencies and breakdown services. It is also a legal requirement in many countries for motorists to carry these transportable warning triangles in their vehicle for use in the event that the vehicle breaks down at the side of the road.

However, the majority of warning triangles currently in use are made from materials that are heavy and rigid, which results in devices that are difficult to store and transport.

This problem is particularly acute for small vehicles such as motorcycles, scooters, etc., which do not have the storage capacity to transport such warning devices. Further, the weight of these triangles may affect the performance of the vehicle, particularly low powered small vehicles.

In addition, warning triangles and other warning devices typically rely on the reflective properties of the materials they are made from to be visible at night or in poor lighting. Such warning triangles are dependent on an external light source, such as the vehicle's headlights, illuminating the triangle in order for it to be visible at night or in poor lighting. These reflective properties are often not sufficient to catch an approaching motorist's eye when driving in such adverse conditions. Further, the light source generally has to be directed at the warning triangle head-on for the motorist to notice the reflective properties of the material. Thus, these warning triangles can fail to adequately warn motorists of an approaching hazard.

SUMMARY OF THE INVENTION

The invention appreciates the need to improve upon the existing warning devices that are currently available. In particular, the invention appreciates the need to provide a warning device that can be transported and used by vehicles that have limited storage space and/or low powered engines (e.g. motorcycles, scooters, small cars etc.), but which still provides effective warning to other motorists that is visible in all conditions.

The warning device and mounting bracket of the invention is defined in the claims, to which reference is now directed.

The invention comprises two aspects.

The first aspect provides a warning device for a vehicle comprising a number plate support portion for supporting a number plate. The warning device further comprises a warning indicator. The number plate support portion is movably attached to the warning indicator and is movable from a first position covering the warning indicator to a second position revealing the warning indicator.

This provides a warning device that can be fitted to a vehicle, for example a motorcycle, in place of the vehicle's number plate. A number plate can then be supported by the number plate support portion. In normal operation of the vehicle, the number plate support portion is arranged in the first position such that the number plate being supported is arranged on the vehicle and visible as if the number plate were connected directly to the vehicle without the warning device. Thus the vehicle, with warning device connected thereto, conforms with any legal requirement in relation to displaying a number plate when driving the vehicle on the roads.

If the vehicle then breaks down, the number plate support portion can be moved to the second position, uncovering the warning indicator, thus warning other motorists of the broken down vehicle. Therefore a neat warning device is provided that, when secured to a vehicle, is integrated into the vehicle in such a way as to not occupy any additional space on the vehicle (it only occupies the space that would be already occupied by the number plate), whilst still providing effective warning to approaching motorists. This is important for vehicles such as motorcycles with limited storage space which would not ordinarily have the capacity to store a standard separate warning triangle, but which would still benefit from the safety provided by such a warning indicator in an emergency.

The number plate support portion may be pivotably attached to the warning indicator, for example by a hinge. In particular, the number plate support portion may be pivotably attached to the warning indicator such that the number plate support portion and the warning device fold together when the number plate support portion is moved from the second position to the first position and fold apart when the number plate support portion is moved from the first position to the second position. Further the number plate support portion may be pivotably attached to the warning indicator such that, in use, the number plate support portion moves in a downward direction relative to the warning indicator when the number plate support portion is moved from the first position to the second position. Optionally, the hinge may be a ratchet hinge configured to support the number plate support portion in one or more positions between the first position and the second position.

The above folding motion of the warning device is advantageous as it allows for the number plate support portion to be easily moved into the second position without being obstructed by features of the vehicle. For example, where the vehicle is a motorcycle, the warning device can be unfolded until the number plate support portion comes into contact with the rear wheel, at which point, due to the folding motion, the warning indicator will be fully visible. Further, the downward direction of the motion is advantageous as it prevents the warning device protruding from the side of the vehicle. Such a protrusion may destabilise the vehicle if it catches the wind or may be at risk of being hit by approaching motorists. It also allows further fittings, such as panniers, to be attached to the vehicle above the warning device. Further, the hinge being a ratchet hinge allows the user to adjust the number plate support portion to any position from the first portion to 180 degrees form the warning indicator. As such, if, for example, work is required on the rear wheel of the motorcycle, the driver could adjust the orientation of the number plate support portion on the vehicle, so that the warning indicator is still visible but work may still be carried out on the wheel.

As a further, optional, feature the power source for powering the warning device, for example one or more batteries, is housed in the hinge. This arrangement allows the batteries to be housed without occupying any additional space in the warning device, avoiding, for example, housing them in a separate dedicated battery housing. This is an efficient way to conserve space and keep the warning device compact.

As an alternative to the folding motion, the number plate support portion is movably attached to the warning indicator such that the number plate support portion moves between the first position and the second position by sliding.

The warning device may comprise a warning indicator that is reflective and/or may comprise an array of lights wherein the lights of the array of lights may be electrically connected together by the electrical circuit. The warning indicator being either reflective or having illumination capabilities, or both, ensures that the warning indicator is clearly visible and noticeable when on display in an emergency.

The warning device may further comprise an electrical switch configured to close when the number plate support portion moves from the first position to the second position thereby completing the electrical circuit. Optionally, the number plate support portion is configured to apply a force to the electrical switch when in the first position, and wherein the electrical switch is configured to open on application of the force. This functionality ensures that the lights of the warning indicator can not be unintentionally left on when the vehicle is in normal use (i.e. when the number plate support portion is in the first position). This reduces the risk that the power source powering the warning device will be drained when an emergency, such as the vehicle breaking down, occurs.

The number plate support portion may further comprise a transparent central section having a number plate support surface for supporting a number plate. Alternatively or in addition, the number plate support portion may further comprise an outer support for a number plate and a inner support for a number plate. In this case, the outer support and the inner support are arranged on opposing sides of the number plate support portion such that the outer support allows display of a number plate when the number plate support portion is in the first position and the inner support allows display of a number plate when the number plate support portion is in the second position. For example, the warning device may comprise a number plate supported by the number plate support portion, wherein the number plate displays text on a first side of the number plate and displays the text on a second side of the number plate opposing the first side. Alternatively, the warning device may comprise a first number plate supported by the outer support of the number plate support portion and a second number plate supported by the inner support of the support portion, wherein the text of the first number plate is inverted with respect to the text of the second number plate.

This allows the warning device to display a number plate at all times, regardless of the position of the number plate support portion; in the first position, the number plate support portion, for example, the transparent central section and/or the outer support, allows a number plate to be displayed from the rear of the vehicle, and in the second position, the transparent central section and/or the inner support allows either the rear surface of the number plate (with duplicate text displayed), or a separate second duplicate number plate, to be displayed from the rear of the vehicle. This is important as it is a legal requirement in some countries for a vehicle to display a number plate at all times.

The warning device may comprise a securing means configured to prevent the number plate support portion moving from the first position. The securing means may comprise one or more buttons configured to allow the number plate support portion to move from the first position. In particular the securing means comprises two buttons configured to allow the number plate support portion to move from the first position when force is applied to both buttons simultaneously. This prevents the number plate support portion transitioning from the first position to the second position without the driver of the vehicle intending it to do so. This is especially important during normal use of the vehicle, for example when the vehicle is travelling at high speeds.

The warning device may comprise a warning indicator support portion configured to support the warning indicator. The warning indicator support portion may be configured such that, when the number plate support portion is in the first position, the warning indicator support portion and the number plate support portion define an enclosed volume within which the warning indicator is contained. This ensures that the warning indicator is protected from external conditions when the number plate support portion is in the first position and in particular, that the warning device provides ingress protection for the warning indicator.

Further, the warning indicator support portion may comprise a protrusion. Here, the warning indicator is arranged to surround the protrusion, such that an inside edge of the warning indicator runs adjacent with an outside edge of the protrusion. This can provide added lateral, vertical and torsional support to the warning indicator, preventing the warning indicator shifting or twisting within the warning indicator support portion. Further, the protrusion may also facilitate and improve the securing of the warning device onto a vehicle.

Preferably, the warning indicator is a triangle, an easily recognisable and well know sign for the warning of an upcoming hazard.

According to the second aspect of the invention, a mounting bracket for mounting a warning device to a vehicle is provided. The mounting bracket comprises a mounting means for mounting the mounting bracket to the vehicle, for example a mounting aperture. Further, the mounting bracket comprises a protrusion arranged to protrude into the warning device and configurable to be fixed to the warning device, wherein the protrusion protrudes into the warning device to provide support to the warning device.

The protrusion of the mounting bracket provides added lateral, vertical and torsional support to the warning device, preventing the warning device shifting or twisting when attached to a vehicle. Further, the protrusion may also facilitate and improve the connection of the mounting bracket to the warning device, as the protrusion can physically guide the connection of the mounting bracket with the warning device.

Optionally, and particularly when the warning indicator of the warning indicator is a warning triangle, the protrusion may be triangle.

A mounting bracket for mounting the warning device according to the first aspect on the invention to a vehicle may be provided. Here, the mounting bracket comprises a mounting means for mounting the mounting bracket to the vehicle. Further, the mounting bracket may comprise a triangular protrusion arranged to protrude into the warning device and configurable to be fixed to the warning device. The triangular protrusion protrudes into the warning device such that the outside of the triangular protrusion conforms with the inside of the triangle of the warning device, thereby providing support to the warning device.

Optionally, the mounting bracket's mounting aperture comprises a set of elongated holes extending through the mounting bracket. This provides a mounting bracket that may be fitted to a wide range of different vehicles.

BRIEF DESCRIPTION OF THE DRAWINGS

The invention will be described in more detail by way of example with reference to the accompanying drawings, in which.

DESCRIPTION OF A PREFERRED
EMBODIMENT OF THE INVENTION

Devices embodying the invention will now be described with reference to the figures. The invention has two aspects. The first aspect relates to a warning device for a vehicle and the second relates to a mounting bracket for mounting warning devices onto vehicles. These two aspects may be used in combination or separately. In other words, the warning device according to the first aspect may be used in combination with the mounting bracket according to the second aspect, or in combination with any other suitable mounting bracket. Likewise, the mounting bracket could be used in combination with the warning device of the first aspect, or any other suitable warning device or fitting for a vehicle. For ease of understanding each aspect will be described in turn.

Warning Device

A warning device according to an embodiment of the first aspect of the invention will now be described with reference to FIGS. 1 to 4.

Figure 1:
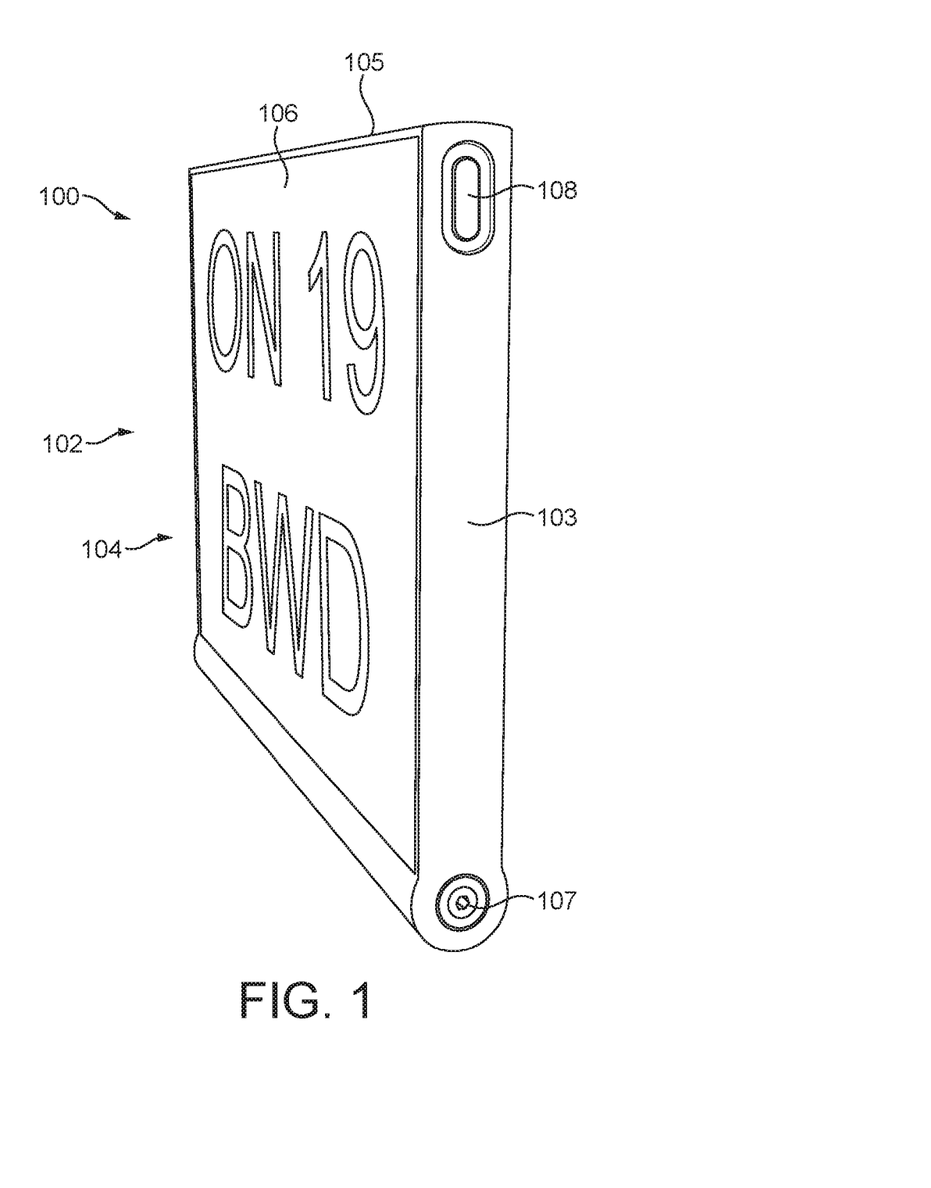
FIG. 1 is a perspective view of a warning device according to an embodiment of a first aspect of the invention showing the device in a folded arrangement.
Figure 2:
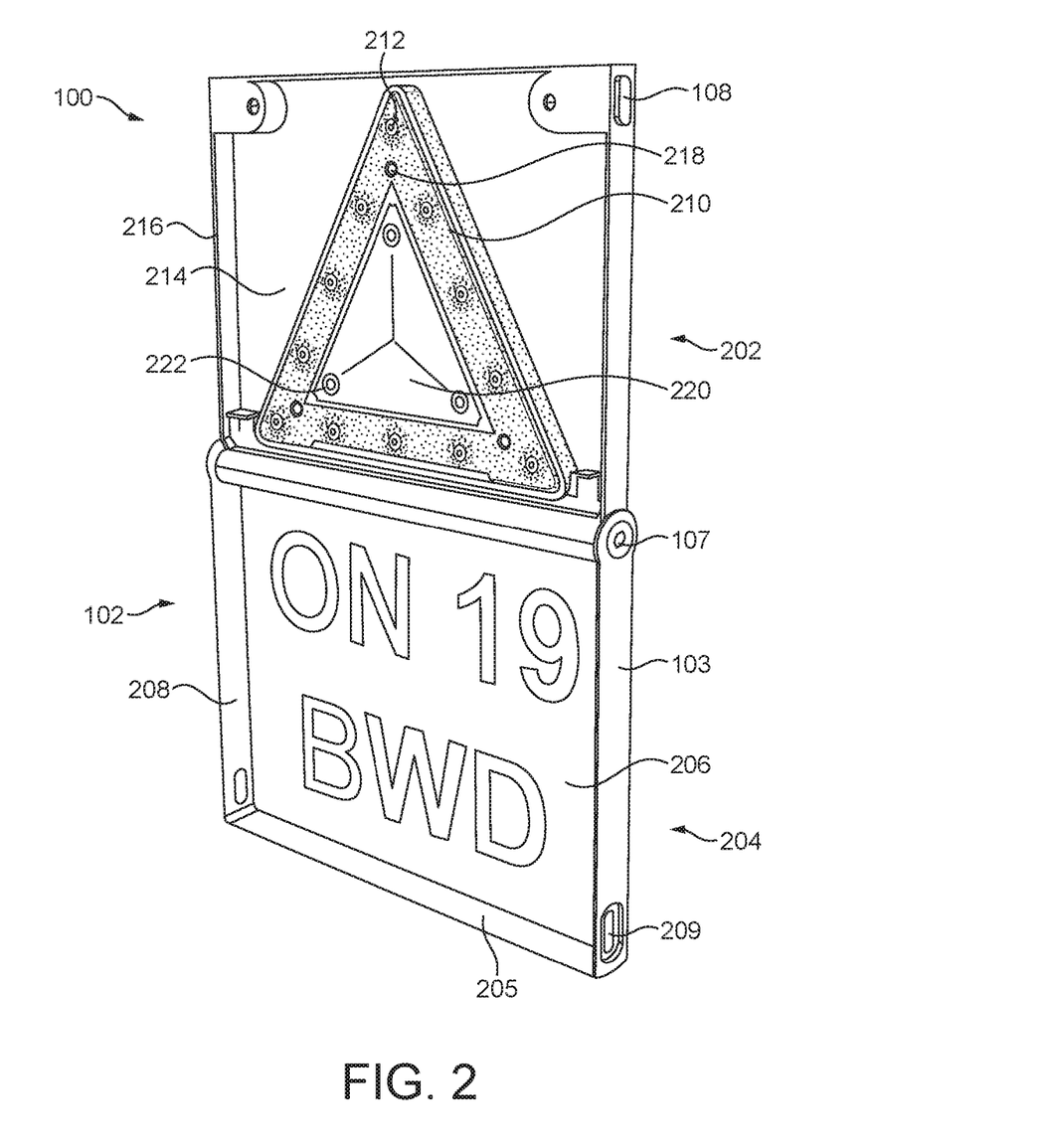
FIG. 2 is a perspective view of a warning device according to the embodiment of the invention showing the device in an unfolded arrangement.

Referring initially to FIGS. 1 and 2, a warning device (100) comprises a first portion, which may be described as a number plate support portion (102). In FIGS. 1 and 2, the number plate support portion is shown supporting a first number plate (106) and a second number plate (206), It will be appreciated that this is for illustrative purposes only and does not limit the warning device to comprising a number plate, or more particularly, two number plates as generally the number plates are removable. Thus they may not form part of the warning device per se but may be features that can be added to or removed from the warning device. Further, the specific number plates shown are shown as examples; any number plate can be supported by the number plate support portion.

Here, the number plate support portion (102) comprises a frame (103) in the form of a regular quadrilateral with sides of substantially the same length as that of a standard number plate (e.g., 230 mm by 178 mm). The frame (103) spans the thickness of the warning device, i.e. the thickness of the frame (103) equals the thickness of the warning device (100).

The frame (103) surrounds a central section (not shown) of the number plate support portion (102) such that each side of the frame (103) connects along a corresponding edge of the central section. The central section comprises an outer surface and an inner surface, the outer surface positioned closer to the exterior of the warning device relative to the inner surface, The thickness of the frame (103) may be greater than the thickness of the central section, such that a portion of the frame's width extends past both the outer surface of the central section and the inner surface of the central section around the perimeter of the central section. In other words, the central section is indented from the edges of the frame on either side of the warning device, with the frame (103) forming a rim (105) surrounding the outer surface of the central section and a rim (205) surrounding the inner surface of the central section.

The outer surface of the central section and its surrounding rim (105) may be described as an outer support (104) for the first number plate (106). The inner surface and its surrounding rim (205) may be described as an inner support (204) which may be configured to support the second number plate (206).

The outer surface of the outer support (104) may be described as a first number plate support surface. The first number plate support surface and the shallow rim (105) of the outer support (104) form a shallow open container in which the first number plate (106) can be placed and from which the first number plate (106) can be removed. When placed in the outer support (104), the rear surface of the number plate (106) lies flush with the number plate support surface of the container, and the rim (105) runs adjacent each side of number plate.

Further, the number plate support surface of the outer support (104) has substantially the same dimensions as the number plate (106). For example, the standard size for a legal number plate in the United Kingdom is approximately 230 mm by 178 mm, which, in the present embodiment, is matched by the dimensions of the support surface. Further, the height of the rim (105) substantially matches the thickness of the number plate (106). Thus, the entire volume of the shallow container is filled by the number plate (106) when placed in the outer support (104). Alternatively, other container widths or depths may be used. For example the outer support may have a rim with a height greater than the thickness of the number plate or less than the number plate, or the outer support may not comprise a rim at all, or only have a rim on one, two or three sides of the support surface.

Similar to the outer support (104), the inner surface of the inner support (204) may be described as a second number plate support surface. The second number plate support surface and the rim (205) together form an open container in which a second number plate (206) can be placed and from which the second number plate (206) can be removed. When placed in the inner support (204), the rear surface of the second number plate (206) lies flush with the second number plate support surface. Like with the outer support (104), the second number plate support surface of the inner support (204) has substantially the same dimensions as the second number plate (206). For example, the standard size for a legal number plate in the United Kingdom is 230 mm by 178 mm, which, in the present embodiment, is matched by the dimensions of the support surface. However, the height of the rim (205) of the inner support (204) is greater than the height of rim (105) of the outer support (104). As a result, the rim (205) of the inner support (204) forms a lip (208) between the opening of the container and the second number plate. In alternative embodiments, such a lip may not be provided, as other dimensions of the inner support may be used. For example the inner support may not comprise a rim at all, or only have a rim on one, two or three sides of the support surface.

Here, the number plates (106) and (206) are secured to their respective support surfaces by adhesive tape, which may be provided on the number plate support surface. However, any suitable securing means may be used, for example clips, magnets, push-fit connections etc.

The warning device (100) further comprises a warning indicator, which is in the form of a triangle (210) in the present embodiment. It will be appreciated however that any suitable shape for providing a warning to approaching motorists may be used, for example, a circle or a word.

In the present embodiment, triangle (210) comprises three arms that are connected together such that they define a triangular opening in the centre of the warning indicator. The width of the arms determine the size of the opening. Here, the three arm are formed from a single piece of transparent plastic material.

The triangle (210) further comprises an array of lights, for example LED lights (212), These lights are connected together by an appropriate electrical circuit configured to provide power to each light in the array. The lights may be programmed to shine continuously when powered on, or flash in unison or randomly, or in any other suitable illumination pattern.

It will be appreciated however, that in alternative embodiments a different triangle may be used, for example, the arms of the triangle may each be formed by a separate piece of material rather than being formed from a single piece of material, or the triangle may not comprise three arms at all and is instead a solid triangle with no triangular opening, or may not be made of transparent plastic material. Instead, a triangle made from an opaque reflective material may be used. In cases where the triangle is made from reflective material, lights (212) may not be provided as the reflective properties of the material may be sufficient to warn motorist of the hazard. Alternatively, lights may be provided to supplement the reflective properties of the material.

The warning device (100) may comprise a warning indicator support portion (202) configured to support the warning indicator (210). The warning indicator support portion (202) may comprise a warning indicator support surface (214) connected to a rim (216) that bounds the warning indicator support surface (214). The rear surface of triangle (210) lies flush with the warning indicator support surface (214). In the present embodiment, the warning indicator (210) is secured to the warning indicator support surface (214) by three screws (218) arranged at the corners of the triangle (210). Although the triangle of the present embodiment has been described as being attached to the warning indicator support portion (202) in this way, any suitable means for securing the warning triangle to the support surface could be used. For example, adhesive tape, clip connectors, magnets, plug and socket connectors could all be used.

The warning indicator support surface (214) may comprise a protrusion, here in the form of a triangular protrusion (220), which may be hollow. The triangular protrusion (220) is arranged in the centre of the warning indicator support surface (214), and is sized to fit within inner portion of the triangle (210) (i.e. within the triangular opening). This protrusion has the same dimensions as the inner portion of triangle (210) such that it fits snugly within this area. The protrusion provides lateral, vertical and torsional support to the triangle, preventing the triangle shifting or twisting within the warning indicator support portion (202). Further, as will be described in greater detail below, the triangular protrusion (220) also facilitates and improves the securing of the warning device (100) onto a vehicle.

Figure 3:
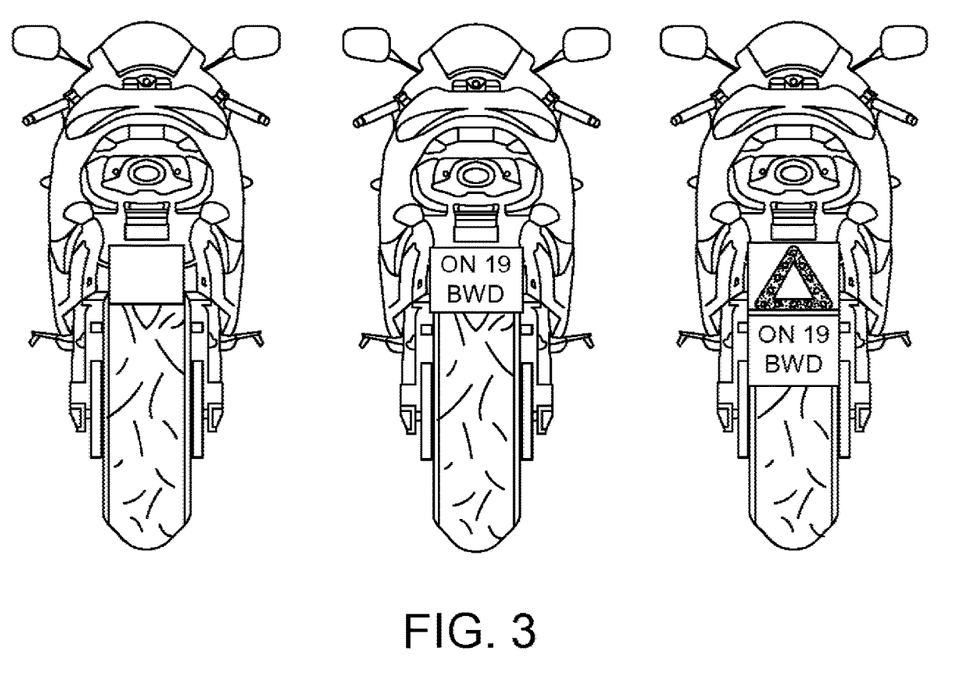
FIG. 3 is an illustration of the warning device of the embodiment of the invention connected to a vehicle in both the folded and unfolded positions.

As can be seen from FIGS. 1, 2, and 3, the number plate support portion (102) is moveably attached to the warning indicator (210) and is configurable to be moved from a first position covering the warning indicator (210), as shown in FIG. 1 and the middle arrangement of FIG. 3, to a second position revealing the warning indicator (210), as shown in FIG. 2 and the right hand arrangement of FIG. 3. In particular, when the number plate support portion (102) is in the first position, the first number plate (106) is visible on the rear of the vehicle, here a motorcycle. When the number plate support portion (102), moves from the first position to the second position, the first number plate (106) is no longer visible. However, the second number plate (206), which is positioned in the number plate support portion (102) displaying text which is inverted relative to the text displayed on the first number plate (i.e. in an orientation that is rotated by 180 degrees compared to the text of first number plate (106)), is visible and in the correct orientation. Thus the vehicle's number plate is correctly displayed regardless of whether the number plate support portion (102) is in the first or second position. In other words, the first number plate (106) is orientated within the outer support (104) such that the number plate is correctly orientated when it is visible on the vehicle (i.e. when the number plate support portion (102) is in the first position), and the second number plate (206) is orientated within the inner support (204) such that that second number plate is correctly orientated when the warning indicator is visible on the vehicle (i.e. when the number plate support portion (102) is in the second position).

Although the present embodiment has been described with two number plate support surfaces for supporting two separate number plates, it should be appreciated that alternatives are possible. For example, the central section could be removed from the warning device, or made from transparent material. In such an embodiment a single number plate could be used, with the plate's text duplicated on the rear face of the number plate, in an orientation that is inverted (i.e. rotated by 180 degrees) compared to the text on the front surface of the number plate. Due to the transparent nature of the central section of the number plate support portion, or the fact that this central section has been removed, the rear surface of the number plate is visible when the number plate support portion is placed in the second position. Thus, the vehicle's number plate is still correctly displayed regardless of whether the number plate support portion (102) is in the first or second position. In the case where the central section is not present, a number plate support rim, which protrudes from the inside surface of the frame (103) of the warning device, may be provided to facilitate connecting a number plate to the warning device.

The number plate support portion (102) is may be pivotably attached to the warning indicator (210), for example, by a hinge (107), such that the number plate support portion (102) and the warning indicator (210) fold together when the number plate support portion (102) is moved from the second position to the first position and fold apart when the number plate support portion (102) is moved from the first position to the second position (as shown in FIGS. 1-3). Here, the hinge is cylindrical in shape and has a length that is equal to the width of the number plate support portion (102). This allows both the number plate and warning indicator support portions (102) and (202) respectively to be connected to the hinge (107) along one side. In particular, both a part of the rim (208) of the inner support (204) of the number plate support portion, and a part of the rim (216) of the warning indicator support portion (202), are connected along the length of the hinge (107). This connection thus provides the moveable attachment between the number plate support portion (102) and the warning indicator (210).

The hinge may be a ratchet hinge configured to support the number plate support portion in a third position or in any number of positions between the folded position and the unfolded position. This allows the number plate support portion to be placed at any angle between 0 and 180 degrees with respect to the warning indicator. This can be advantageous, for example in cases where the driver of a motorcycle requires access to the rear wheel. However, it will be appreciated that any appropriate hinge may be used.

The hinge (107) is also dimensioned such that it can house a power source, such as a battery or batteries, for powering the warning device's electrical circuit, particularly the lights of the warning indicator (210). Alternatively, the batteries may not be housed in the hinge, for example they may be housed in a separate dedicated housing.

The electrical circuitry of the warning device may be configured such that the power source cannot provide power to the warning indicator (210), and therefore to the warning indicator's lights (212), when the warning device (100) is in the folded position, and automatically provides power to the circuit, therefore illuminating the lights (212), when the number plate support surface (102) moves away from the first position. This functionality may be provided by an electrical switch (not shown) configured to close when the number plate support portion moves from the first position to the second position thereby completing the electrical circuit. In particular, the electrical switch may be in the form of a push button, wherein the number plate support portion is configured to apply a force to the electrical switch when in the first position, and wherein the electrical switch is configured to open on application of the force. In this case, the push button may protrude from the surface of the warning indicator support surface (214). When in the folded position, the number plate support portion (102), and more specifically, the inside surface of the number plate support portion (102) applies a force to the protruding push button, opening the electrical switch.

When the warning device begins to unfold, the inside surface of the number plate support surface (102) moves away from the warning indicator support surface (214) and thus relieves the force on the push button. When this happens the electrical switch closes causing the lights to illuminate automatically. For the avoidance of doubt, the term "open" in relation to the electrical switch refers to the position of the switch in which the electrical circuit is not complete and thus current cannot flow around the circuit. An electrical switch in a "closed" position completes an electrical circuit, allowing current to flow and the lights (212) to illuminate.

Although a push button electrical switch has been described for the present embodiment, different types of switches could be used to provide the same functionality. For example a magnetic reed switch arrangement could be provided, with a magnet provided on the number plate support surface and a reed switch provided on the warning indicator support surface.

Figure 4:
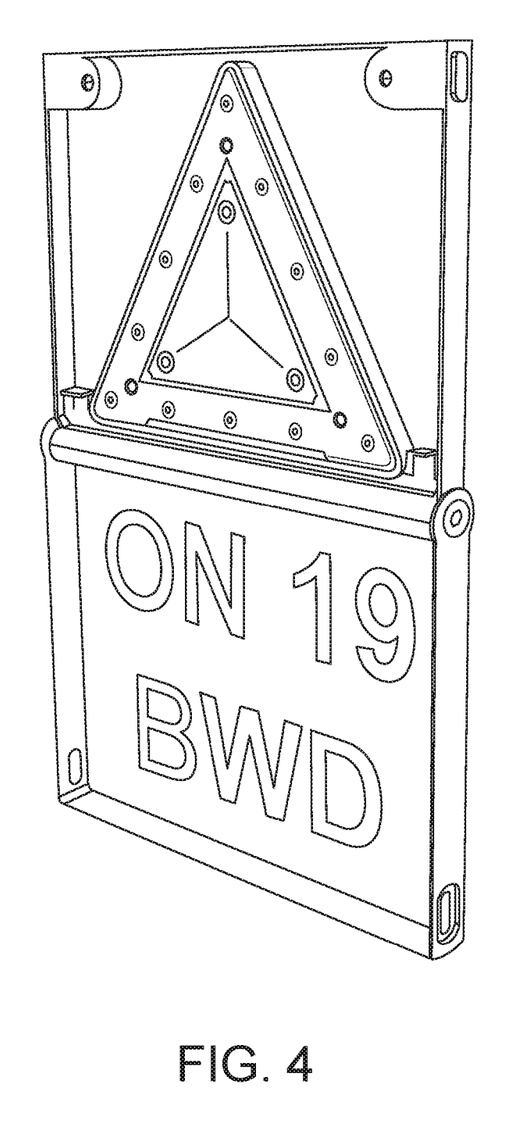
FIG. 4 is a perspective view of a warning device according to the embodiment of the invention showing the device in an unfolded arrangement in which the LED lights of the warning indicator are powered off.

In the present embodiment, the warning indicator has a default setting which is programmed to turn on automatically as described above. This default setting may be that all the lights of the warning indicator shine continuously. Alternatively, in other embodiments, the lights may flash in unison to provide a pulsing pattern of illumination, or other appropriate patterns, such as sequential illumination, may be provided as the default setting. In addition, the lights may be programmed to provide various patterns of illumination. In such a case, a mode switch or button may be provided, for example adjacent the on off switch, to allow the user to cycle through the various patterns of illumination. For example, the triangle may have a default setting, in which all the lights of the warning indicator shine continuously, and a second setting where the lights pulse in unison, which can be selected by pressing the mode button. It will be appreciated that any number of modes and illumination patterns may be provided.

The warning device (100) further comprises a securing means configured to prevent the number plate support portion moving when in the first position. In the present embodiment, the securing means comprises two buttons (108) configured to allow the number plate support portion to move from the first position when force is applied to both buttons simultaneously. These buttons are arranged on the outward facing surface of the rim (216) of the warning indicator support portion (202) and on opposing sides of the warning device (100). These buttons are biased by a resilient member, such as a spring, into an extended position. An external force may then be applied to the buttons to force the buttons, against the spring, into a retracted position. In the extended position, the buttons extend further from the sides, i.e. the rim (216), of the warning device relative to the retracted position. When the external force is removed, the buttons return to the extended position due to the presence of the resilient member.

Arranged at a corresponding position on the rim (205) of the inner support (204), are two holes (209) in the rim. When the number plate support portion (102) is in the first position, the buttons (108), in the extended position, extend into the holes (209) preventing the number plate support portion (102) from moving from the first position. The number plate support portion (102) may then be transitioned from the first position when a user presses both buttons simultaneously.

This mechanism securely fastens the number plate support portion (102) to the warning indicator (i.e. in the first position) when the vehicle is being driven such that the support portion (102) cannot inadvertently transition from the first position to the second position without the intention of the driver.

This is the preferred securing means for the present invention as the requirement of simultaneously pushing the buttons reduces the risk of the number plate support portion unintentionally moving away from the first position (e.g. due to being knocked whilst the vehicle is being driven). It also allows the warning device to be placed securely in the first position without further steps having to be taken by the user; the buttons automatically move into the holes once the number plate supporting portion and the warning indicator are brought together. However, it will be appreciated that other securing means may be used, for example a single button, a clip/clips, lock and key arrangements etc.

When the number plate support portion (102) is secured in the first position, the lip (208) overlaps with the outside edge of the warning indicator support portion (202). In particular, the inside surface of the rim (205) of the number plate support portion runs adjacent to the outside surface of the rim (216) of the warning indicator support portion. Thus the warning indicator support portion (202) and the number plate support portion (102) define an enclosed volume within which the warning indicator (210) is contained. This protects the warning indicator from external conditions, such as rain, when the warning device is connected to a vehicle in the folded position.

As a further optional measure to protect against the ingress of water and other material into the interior of the warning device when in the folded position, the rim (216) of the warning indicator support portion (202), may have a greater thickness than the rim (205) of the inner support of the number plate support portion, preventing the rim of the inner support from protruding past the rear surface of the warning indicator support surface. This helps to channel water off the rear surface of the warning device and around the warning device, minimising potential ingress of fluid into the interior of the device. This effect may be further improved by shaping the rear surface of the warning device to help channel water off this surface.

This warning device may then be fitted to a vehicle, such as a motorcycle, using the mounting bracket described below. Alternatively, any suitable mounting means may be used, for example the warning plate may be bolted to a standard bracket used for number plates, or any other appropriate bracket, or the warning device may be clipped, bolted or otherwise fastened directly to the vehicle.

Therefore, a neat compact arrangement is provided, wherein, in normal operation of the vehicle, the warning device is in its folded position (as shown in FIG. 1 and the middle arrangement of FIG. 3) and resembles a number plate. In the event of an emergency, such as the vehicle breaking down, the warning device can be moved into an unfolded position (as shown in FIG. 2 and the right hand arrangement of FIG. 3). In this case, the vehicle's number plate is still visible and correctly orientated, as is a legal requirement in many countries. In addition, the warning indicator is also visible, providing approaching motorists with a clear easily identifiable warning of the approaching hazard (the broken down vehicle). Thus, improving the safety of both the driver of the vehicle and the approaching motorists.

Mounting Bracket

In the following, an embodiment of the mounting bracket according to the second aspect of the invention will be described in relation to the warning device laid out above. However, as stated previously, the mounting bracket of the invention may be used with any appropriate warning device or fitting that needs to be attached securely to a motor vehicle.

Figure 5:
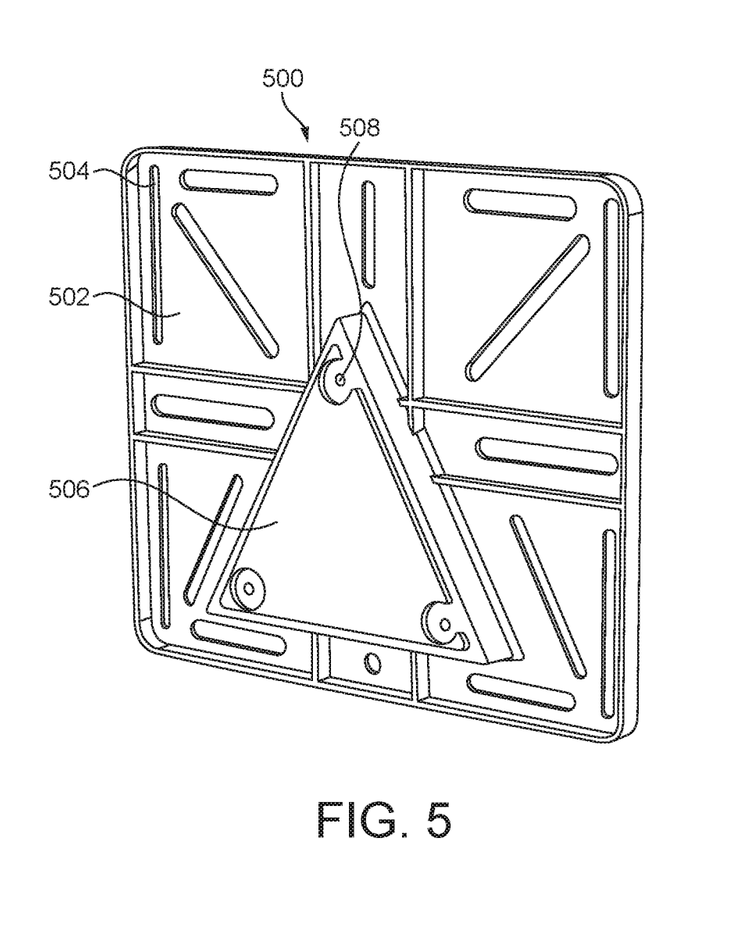
FIG. 5 is a perspective view of a mounting bracket according to an embodiment of a second aspect of the invention.

FIG. 5 shows a mounting bracket (500) according to an embodiment of the second aspect of the invention. The mounting bracket (500) is formed from a single piece of plastic material shaped into a regular quadrilateral with dimensions to match a standard number plate.

The mounting bracket comprises a connection surface (502) for connecting with a warning device, here warning device (100). The mounting bracket further comprises a mounting surface (not shown) for attaching the mounting bracket to a vehicle, for example to the rear of a motorcycle. The connection surface (502) and the mounting surface are arranged on opposing sides of the mounting bracket.

Further, the mounting bracket comprises a protrusion (506), which, in the present embodiment, is in the form of a triangle to match the protrusion (220) of warning device (100). However, if a different warning device is used having a different shaped protruding portion, then the protrusion (506) of the mounting bracket (500) may be shaped accordingly. The protrusion protrudes from the connection surface (502) of the mounting bracket, and is arranged centrally on the connection surface.

When the mounting bracket (500) is connected to the warning device (100), the connection surface (502) is brought into contact with the rear surface of the warning device (100) and, more particularly, the rear surface of the warning indicator support portion (202). Further, the protruding triangle (506) of the mounting bracket, protrudes into a hollow interior of the protruding triangle (220) of the warning device (100).

In the present embodiment, the mounting bracket (500) is then secured to the warning device (100) by screws which fit through holes (222) in the protrusion (220) of the warning device (100) and corresponding holes (508) in the mounting bracket (500). Fitting the protruding triangle (506) of the mounting bracket (500) into the protruding triangle (220) of the warning device (100) ensures that the respective sets of holes (222) and (508) of the warning device and the mounting bracket align, thus facilitating attaching the warning device to the mounting bracket.

The mounting bracket also comprises a mounting means for mounting the mounting bracket to the vehicle which, here, is at least one mounting aperture for mounting the mounting bracket to the vehicle. More particularly, the mounting aperture comprises a set of elongated holes (504) extending through the mounting bracket. These holes (504) are arranged at various positions around the mounting bracket, allowing the mounting bracket to be attached to a large range of different vehicles, which may have different number plate attachment means; provided two or more of the elongated holes can be aligned with the position of corresponding holes used to screw a number plate onto the vehicle, the mounting bracket can be securely fastened to the vehicle. As the mounting bracket is designed to have the same dimensions and outline as a number plate, this will normally, if not always, be the case.

Thus, the mounting bracket of the present invention is configured to be attachable to a wide range of different vehicles, such as different motorcycles, scooters, cars, etc., allowing the warning device to be attached to different vehicles without having to modify the warning device for a particular vehicle. In this way, the mounting bracket may be described as a universal mounting bracket, which, when connected to the warning device, allows the warning device to be universally connected to the vehicle regardless of the type of vehicle or the kind of number plate support provided by the vehicle.

It will be appreciated that the above description relates to a particular embodiment of the mounting bracket and that alternatives are possible. For example, the mounting means of the housing bracket may not be provided by elongated holes (504). Instead, any appropriately shaped holes for receiving screws could be used, or alternatively or in addition, a different securing means such as clips, hooks or magnets could be used to secure the mounting bracket to a vehicle.

Further, the warning device (100) may not be secured to the mounting bracket (500) by screws passing through holes in protrusion (220) of the warning device and the protrusion (506) of the mounting bracket. Instead any suitable securing means could be used, for example magnets placed on the exterior surface of the protrusion (506) of the mounting bracket and on the interior surface of the protrusion (220) of the warning device could be used.

The invention claimed is:

1. A warning device for attachment to a vehicle in place of the vehicle's number plate, the warning device comprising:
   a number plate support portion for supporting a number plate;
   a warning indicator comprising one or more lights and an electrical circuit for providing power to the one or more lights;
   a power source for powering the warning indicator; and
   an electrical switch;
   wherein the number plate support portion is movably attached to the warning indicator, the number plate support portion being moveable from a first position covering the warning indicator to a second position revealing the warning indicator; and
   wherein the number plate support portion is configured to apply a force to the electrical switch when in the first position, and wherein the electrical switch is configured to open on application of the force and configured to close when the number plate support portion moves from the first position to the second position thereby completing the electrical circuit.

2. The warning device according to claim 1, wherein the number plate support portion is pivotably attached to the warning indicator.

3. The warning device according to claim 2, wherein the number plate support portion is pivotably attached to the warning indicator such that the number plate support portion and the warning device fold together when the number plate support portion is moved from the second position to the first position and fold apart when the number plate support portion is moved from the first position to the second position.

4. The warning device according to claim 2, wherein the number plate support portion is pivotably attached to the warning indicator such that, in use, the number plate folds in a downward direction relative to the warning indicator when the number plate support portion is moved from the first position to the second position.

5. The warning device according to claim 2, wherein the number plate support portion is pivotably attached with by a ratchet hinge configured to support the number plate support portion in one or more positions between the first position and second position.

6. The warning device according to claim 2, wherein the number plate support portion is pivotably attached by a hinge and the power source for powering the warning device is housed in the hinge.

7. The warning device according to claim 1, wherein the number plate support portion is movably attached to the warning indicator such that the number plate support portion is moveable between the first position and the second position by sliding.

8. The warning device according to claim 1, wherein the number plate support portion moves downwards in relation to the direction indicator when the number plate support portion moves from the first position to the second position.

9. The warning device according to claim 1, wherein the warning indicator is reflective.

10. The warning device according to claim 1, wherein the number plate support portion further comprises a transparent central section having a number plate support surface for supporting the number plate.

11. The warning device according to claim 1, wherein the number plate support portion further comprises an outer support for a first number plate and an inner support for a second number plate, the outer support and the inner support arranged on opposing sides of the number plate support portion such that the outer support allows display of the first number plate when the number plate support portion is in the first position and the inner support allows display of the second number plate when the number plate support portion is in the second position.

12. The warning device according to claim 11, wherein the warning device comprises the first number plate supported by the outer support and the second number plate supported by the inner support of the support portion, wherein text of the first number plate is inverted with respect to text of the second number plate.

13. The warning device according to claim 1, wherein the warning device comprises the number plate supported by the number plate support portion.

14. The warning device according to claim 1, wherein the warning device comprises the number plate displaying text on a first side of the number plate and displaying the text on a second side of the number plate opposing the first side, wherein the number plate is supported by the number plate support portion.

15. The warning device according to claim 1, wherein the warning device comprises a securing means configured to prevent the number plate support portion moving from the first position.

16. The warning device according to claim 15, wherein the securing means comprises one or more buttons configured to allow the number plate support portion to move from the first position.

17. The warning device according to claim 15, wherein the securing means comprises two buttons configured to allow the number plate support portion to move from the first position when force is applied to both buttons simultaneously.

18. The warning device according to claim 1, wherein the warning device further comprises a warning indicator support portion configured to support the warning indicator.

19. The warning device according to claim 18, wherein the warning indicator support portion is configured such that, when the number plate support portion is in the first position, the warning indicator support portion and the number plate support portion define an enclosed volume within which the warning indicator is contained.

20. The warning device according to claim 18, wherein the warning indicator support portion further comprises a protrusion arranged to support the warning indicator.

21. The warning device according to claim 20, wherein the warning indicator is arranged to surround the protrusion, such that an inside edge of the warning indicator runs adjacent with an outside edge of the protrusion.

22. The warning device according to claim 1, wherein the warning indicator is a triangle.

23. A mounting bracket for mounting a warning device to a vehicle, the warning device for attachment to a vehicle in place of the vehicle's number plate, the warning device comprising:
- a number plate support portion for supporting a number plate;
- a warning indicator comprising one or more lights and an electrical circuit for providing power to the one or more lights;
- a power source for powering the warning indicator; and
- an electrical switch;
- wherein the number plate support portion is movably attached to the warning indicator, the number plate support portion being moveable from a first position covering the warning indicator to a second position revealing the warning indicator; and
- wherein the number plate support portion is configured to apply a force to the electrical switch when in the first position, and wherein the electrical switch is configured to open on application of the force and configured to close when the number plate support portion moves from the first position to the second position thereby completing the electrical circuit and the mounting bracket comprising:
- a mounting means for mounting the mounting bracket to the vehicle; and
- a protrusion arranged to protrude into the warning device and configurable to be fixed to the warning device such that the protrusion protrudes into the warning device to provide support to the warning device.

24. The mounting bracket according to claim 23, wherein the protrusion is a triangle.

25. The mounting bracket according to claim 23, wherein the mounting means comprises one or more mounting apertures.

26. The mounting bracket according to claim 25, wherein the one or more mounting apertures comprises a set of elongated holes extending through the mounting bracket.

* * * * *